July 9, 1968  B. J. THOMPSON  3,391,715
METHOD OF WORKING WIRE OR THE LIKE AND TOOL
FOR PRACTICING THE METHOD
Filed Dec. 17, 1964  4 Sheets-Sheet 1

BOBBIE JEAN THOMPSON
INVENTOR.
KENDRICK AND STOLZY
BY

ATTORNEYS

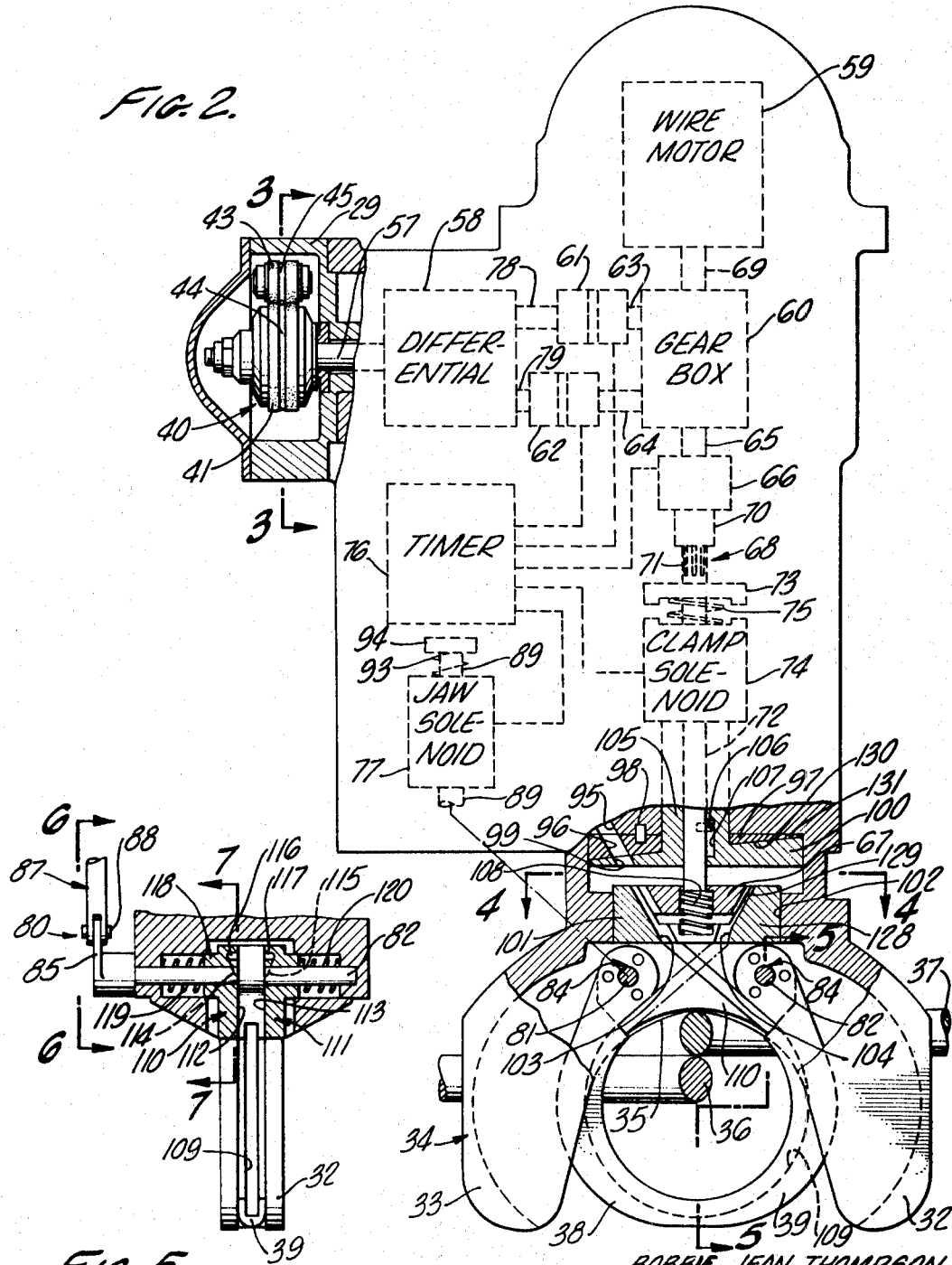

July 9, 1968    B. J. THOMPSON    3,391,715
METHOD OF WORKING WIRE OR THE LIKE AND TOOL
FOR PRACTICING THE METHOD
Filed Dec. 17, 1964                  4 Sheets-Sheet 4
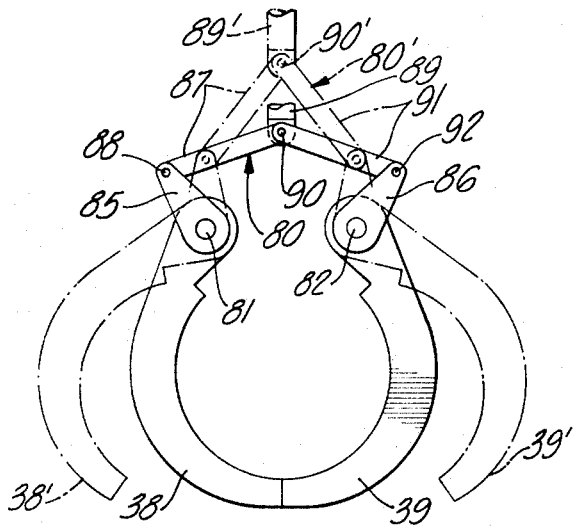
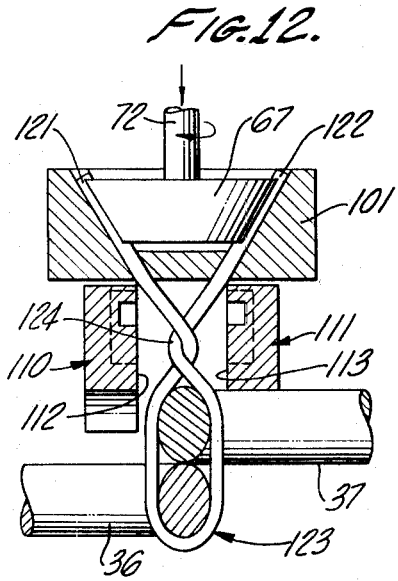
FIG. 12.
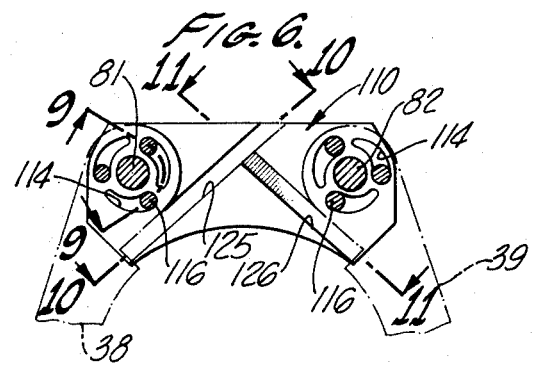
FIG. 6.
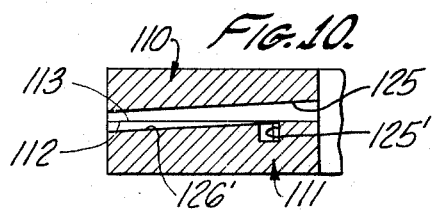
FIG. 10.
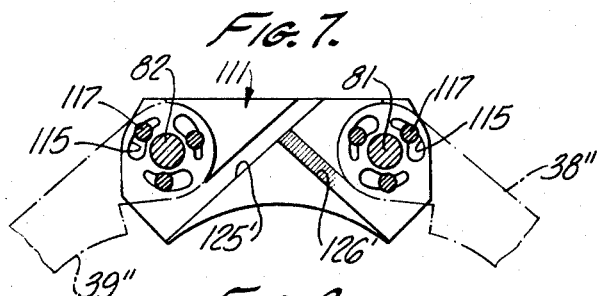
FIG. 7.
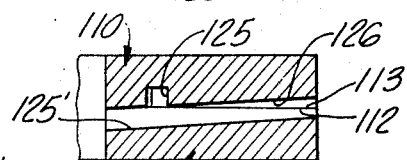
FIG. 11.
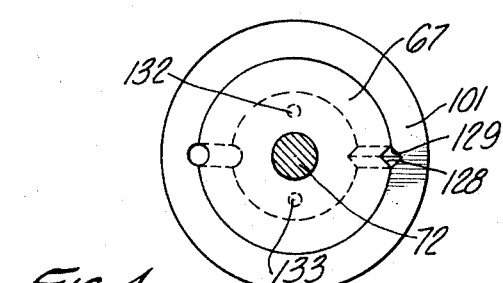
FIG. 8.
FIG. 9.
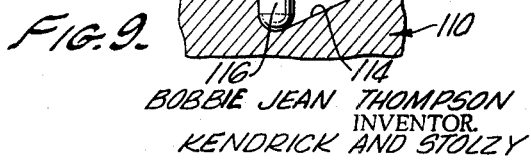
FIG. 4.
BOBBIE JEAN THOMPSON
INVENTOR.
KENDRICK AND STOLZY
BY
*A. Donald Stolzy*
ATTORNEYS United States Patent Office 3,391,715
Patented July 9, 1968

3,391,715
METHOD OF WORKING WIRE OR THE LIKE AND TOOL FOR PRACTICING THE METHOD
Bobbie Jean Thompson, Garden Grove, Calif., assignor to Thompson Tools, Inc., Los Angeles, Calif., a corporation of California
Filed Dec. 17, 1964, Ser. No. 418,974
9 Claims. (Cl. 140—93.6)

ABSTRACT OF THE DISCLOSURE

A method of guiding, clamping and twisting wire around the intersection of vertical and horizontal steel reinforcement rods for use in reinforced concrete and the like in building construction.

---

This invention relates to the art of manipulating wire or like materials, and more particularly to a method of tying a wire about an object and a machine for performing the method.

Although the present invention may have many applications and should not therefore be limited to those specifically set forth in this disclosure, the invention has been found to possess considerable utility in making a diagonal wire tie around vertical and horizontal steel rods used in the reinforced concrete of the walls, floors and ceilings of a building construction.

In the past, such ties have been made manually. Machines have been designed for automating this work, but none of these machines has achieved any substantial commerical success due to ineffective operation and a large number of complicated component parts that are required in the construction of each.

In accordance with the present invention, the above-described and other disadvantages of the prior art are overcome by guiding a length of wire around an object to be tied, and positively and securely holding one end of the wire and drawing the other end up to pull the wire to a position around the object. A portion of the wire is then severed and the ends of the severed portion twisted.

The wire may thus be accurately guided and positively pulled tightly and twisted tightly around steel reinforcement rods to provide a secure connection therebetween. Further, these steps may be satisfactorily and efficiently performed in a very short time.

It is also an outstanding feature of the present invention that the above-described steps may be formed by the use of a machine having only a few component parts, these parts being relatively uncomplicated.

The above-described and other advantages of the present invention will be better understood from the following description when considered in connection with the accompanying drawings.

In the drawings which are to be regarded as merely illustrative:

FIG. 2 is a partially diagrammatic top plan view of the tool shown in FIG. 1, partly in section;

FIG. 4 is a transverse sectional view of the tool taken on the line 4—4 shown in FIG. 2;

FIG. 5 is a longitudinal sectional view through a portion of the tool taken on the line 5—5 shown in FIG. 2;

FIG. 6 is a top plan view of a pair of tool jaws, and a linkage for opening and closing the jaws;

FIG. 7 is a longitudinal sectional view of the tool taken on the line 7—7 shown in FIG. 5 with the jaws of the tool closed;

FIG. 8 is a longitudinal sectional view of the tool taken on the line 7—7 shown in FIG. 5 with the jaws of the tool open;

FIG. 9 is a sectional view through a jaw and a wire guide taken on the line 9—9 shown in FIG. 7;

FIG. 10 is a sectional view of a wire guide taken on the line 10—10 shown in FIG. 7;

FIG. 11 is a sectional view through the wire guide taken on the line 11—11 shown in FIG. 7;

FIG. 12 is a longitudinal sectional view of a portion of the tool shown in FIG. 2 with ends of a severed portion of a length of wire partially twisted around a pair of adjacent steel reinforcement rods in a latticework thereof to be erected for use in a reinforced concrete structure;

Figure 1:
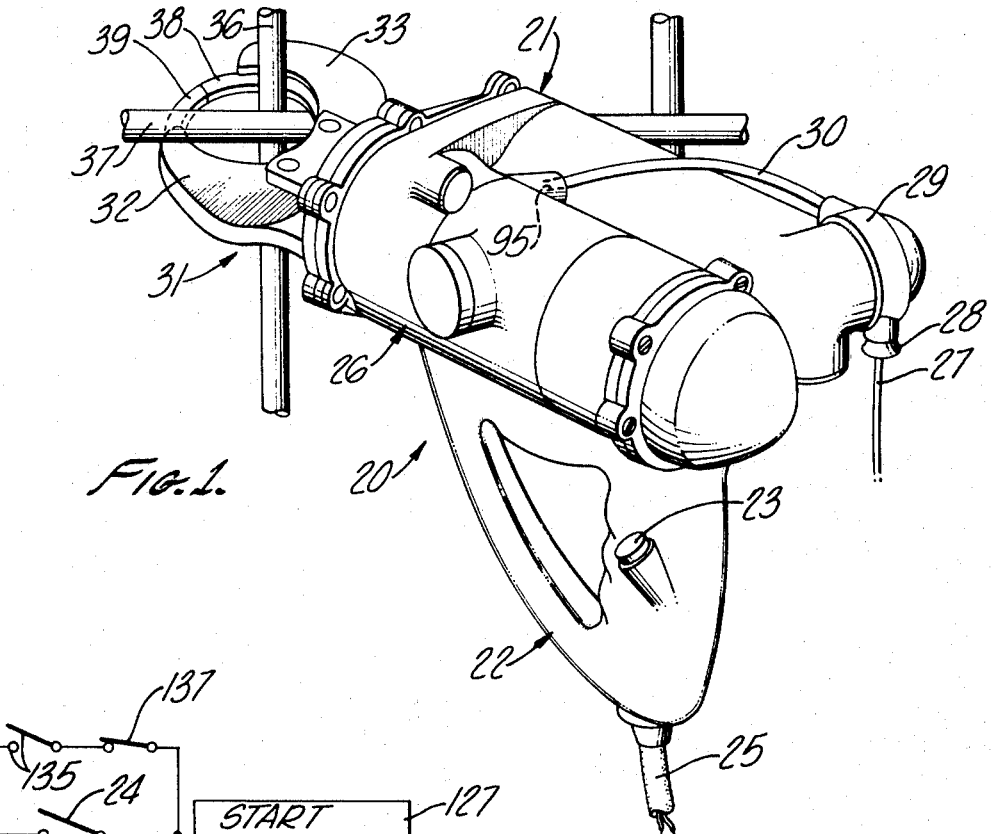
FIG. 1 is a perspective view of a wire tying machine constructed in accordance with the present invention.

In FIG. 1, a tool 20 is shown including a wire tying machine 21 set upon a pistol grip 22. Machine 21 is operated by depressing a push button 23 that operates a momentary contact switch 24, shown in FIG. 13.

Figure 13:
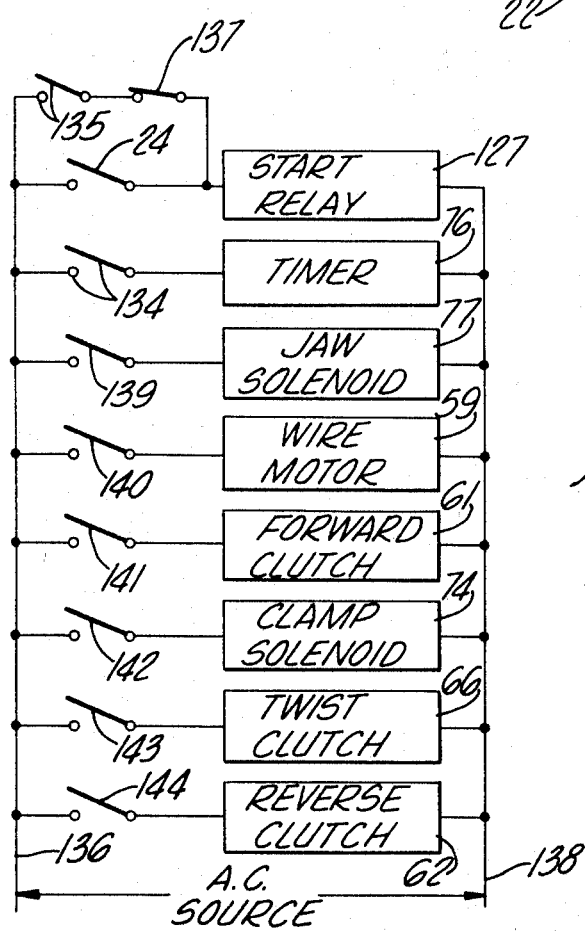
FIG. 13 is a schematic diagram of an electrical portion of the tool shown in FIG. 2.

The tool 20 is electrically operated. Electrical power may be supplied to the tool 20 through a conventional cord 25. Although A.C. electrical power is indicated in FIG. 13, it will be understood that D.C. power may also be supplied. Further, an operator may carry a D.C. battery on his person to operate tool 20. Further, if desired, a battery may be located within a case or body for machine 21 indicated at 26 in FIG. 1.

Wire may be supplied to machine 21 from a conventional reel, also carried by an operator, and suspended from his belt or carried on his person in some other convenient manner. A coil of wire may be carried by the operator on a reel, either freely rotatable as wire is used, required or taken into machine 21, or the reel may be spring loaded, so as to yieldingly resist withdrawal of wire therefrom. The resistance to wire withdrawal may be rather slight. Further, the reel and the tension means provided by the wire taken therefrom may be entirely conventional.

Wire is taken into machine 21 at 27 as shown in FIG. 1. It is taken through a flared hollow tube or ferrule 28 that may have an internal surface similar to that of a frustrum of a cone.

Case 26 has a friction drive housing 29, the output of which is wire 27. Wire 27 is projected through a tube 30 to a forward portion of machine 21 indicated at 31 in FIG. 1.

Figure 3:
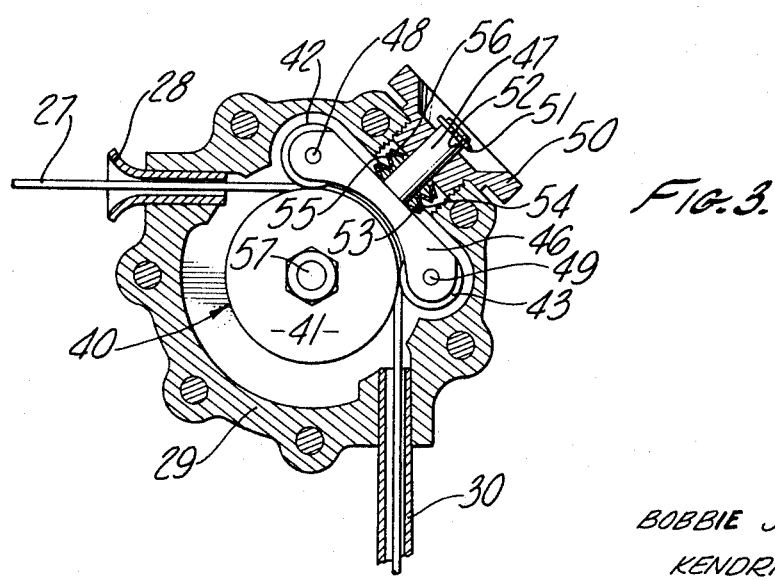
FIG. 3 is a sectional view of the tool taken on the line 3—3 shown in FIG. 2.

The forward portion 31 of machine 21 has a pair of cup-shaped guards 32 and 33 integral with one another. Guard 33 is best shown in FIGS. 2 and 3. Guards 32 and 33 together form a U-shaped member 34 shown in FIG. 2 that has a bight portion 35. Guards 32 and 33 form the legs of member 34. Bight portion 35 of member 34 serves as a stop to prevent steel reinforcement rods 36 and 37 from traveling any further upwardly, as viewed in FIG. 2, into the throat of two jaws 38 and 39.

As shown in FIG. 2, a friction drive is provided at 40. Friction drive 40 includes a larger pressure roll 41 and a pair of smaller pressure rolls 42 and 43. Pressure rolls 42 and 43 are identical.

Note will be taken that both pressure rolls 41 and 42 have circumferential grooves 44 and 45, respectively, to fit wire 27.

As shown in FIG. 3, pressure rolls 42 and 43 are rotatable in a yoke 46 fixed to a shaft 47. Rolls 42 and 43 are respectively rotatable about shafts 48 and 49 respectively, fixed through yoke 46.

Shaft 47 extends through an adjustment plug 50 and is held there by a snap ring 51 in a groove 52 in shaft 47.

Pressure rolls 42 and 43 are held in firm engagement with wire 27 by annular inclined springs 53, 54, 55 and 56.

The largest pressure roll 41 is keyed to a drive shaft 57 shown in FIG. 2, which is the output shaft of a differential 58.

Differential 58 is driven by an electric motor 59 through a gear box 60 and clutches 61 and 62. The gear box has a first output shaft 63 to clutch 61, a second output shaft 64 to clutch 62, and a third output shaft 65 to a third clutch 66.

Motor 59 rotates a disc 67 having the shape of a frustrum of a cone through gear box 60, shaft 65, a clutch 66 and a conventional splined connection 68.

As shown in FIG. 2, motor 59 has an output shaft 69 connected therefrom to gear box 60. Splined connection 68 includes a clutch collar 70 and a machined shaft end 71 of a shaft 72 fixed to disc 67.

A disc 73 is also fixed to shaft 72. Disc 73 is employed to close the magnetic circuit of a solenoid 74 when solenoid 74 is energized. The normal position of shaft 72 is that as shown in FIG. 2 when solenoid 74 is de-energized. In that case, disc 73 is urged upwardly to the position shown by a coiled spring 75.

A timer is provided as shown at 76 to operate clutches 61, 62 and 66. The timer also operates solenoid 74 and a second solenoid 77.

All of the structures shown in dotted blocks in FIG. 2 may be conventionally constructed. Clutches 61, 62 and 66 are electromagnetic clutches. These clutches may thus be conventional. They also may be spring biased to their open positions, if desired, as is conventional. Clutches 61 and 62 may be conventional, but of the type which automatically brake input shafts 78 and 79 connected respectively therefrom to differential 58 when these clutches are de-energized.

As is evident, solenoid 74 is biased by spring 75 to its de-energized position. Solenoid 77 may be similarly spring biased. Solenoid 77 is employed simply to operate jaws 38 and 39, as shown in FIG. 6. Jaws 38 and 39 are opened and closed through a linkage 80. Jaws 38 and 39 are normally spring biased by the spring of solenoid 77 to their open positions shown in dotted lines at 38′ and 39′ in FIG. 6. Jaws 38 and 39 are rotatable about pins 81 and 82 keyed thereto respectively at 83 and 84, as shown in FIG. 2.

As shown in FIG. 6, linkage 80 includes crank arms 85 and 86 fixed respectively to jaws 38 and 39. A bar 87 is pinned to crank 85 at 88 and to a plunger shaft 89 at 90. A second bar 91 is pinned to crank 86 at 92, and at the same position 90 on plunger shaft 89. Plunger shaft 89 is normally urged by the spring of solenoid 77 to the position shown at 89′ in FIG. 6. This opens jaws 38 and 39, as indicated at 38′ and 39′. When plunger shaft 89 is moved to the position 89′, linkage 80 moves from the solid line position shown in FIG. 6 to the dotted line position 80′ shown in FIG. 6. Thus, when solenoid 77 is energized, plunger shaft 89 is lowered to the solid line position shown in FIG. 6 and jaws 38 and 39 close as shown in the solid lines in FIG. 6.

As shown in FIG. 2, plunger shaft 89 is biased upwardly by a spring 93 which urges plunger shaft 89 upwardly through a flange 94 fixed thereto.

As shown in FIG. 2, body 26 has a bore 95 that is held in alignment with the internal surface of tube 30, the tube 30 being hollow to carry wire 27.

As shown in FIG. 2, wire 27 is fed through a bore 96 in an upper shear plate 97 that is pinned to body 26 at 98. A bore 99 is held in alignment with shear plate bore 96, shear plate bore 99 being located in a lower shear plate 100.

A ring 101 rotates on a bearing surface 102. Ring 101 has openings therein 103 and 104 to receive wire 27. The disc 67 in the shape of a frustrum of a cone fits inside ring 101. The internal surface of ring 101 is provided with a shape generally similar that of a frustrum of a cone.

Disc 67 is pressed onto shaft 72 fixed thereto and therefore rotates therewith.

A sleeve integral with lower shear plate 100 is provided at 105 to surround shaft 72. Shaft 72 has a key 106 fixed thereto which rests in a keyway 107 in sleeve 105. Shaft 72 therefore can be lowered vertically in sleeve 105, but cannot rotate without rotating sleeve 105.

Helically coiled compression spring 108 keeps disc 67 and ring 101 spaced apart.

As shown in FIG. 5, jaw 39 has a groove 109 therein to receive wire 27. In this respect, jaw 38 is identical to jaw 39. Guides are provided at 110 and 111 to guide wire 27 through grooves in guides 110 and 111, to be described. The guide grooves are located in alignment with openings 103 and 104, and corresponding grooves in jaws 39 and 38, respectively. Surfaces 112 and 113 on guides 110 and 111, respectively, abut surfaces on opposite sides of the jaws 38 and 39. Guide 110 has a series of arcuately shaped grooves 114 in faces 112 thereof of a depth varying with the angular position thereof about the axes of pins 81 and 82. Guide 111 has similar grooves 115 in the face 113 thereof. Each jaw 38 and 39 carries three pins 116 and 117, respectively, in each of the opposite faces thereof to rest in grooves 114 and 115, respectively.

Both guides 110 and 111 are identical. For this reason, only guide 110 will be described in detail. Except for grooves 114, the central portion of the inside face of guide 110 is flat. Surfaces 112 on opposite sides of the central portion are flat but offset a distance equal to one-half the thickness of the jaws 38 and 39 from the central portion. The outside face of guide 110 is also flat with the exception of a centrally located cylindrical boss 118 thereon which surrounds pin 82. Note will be taken that pin 82 is fixed to crank 86 and to jaw 39, as well.

Guides 110 and 111 have helically coiled compression springs 119 and 120, respectively, to urge them against the opposite sides of jaws 38 and 39. Rotation of jaws 38 and 39 to their closed positions causes guides 110 and 111 to abut each other in the space between the jaws near pins 81 and 82. When the jaws are spread apart, pins 112 and 113 force guides 110 and 111 apart so that the ends 121 and 122 of a severed portion 123 of a length of wire may be twisted as indicated at 124 in FIG. 12. When jaws 38 and 39 are closed and guides 110 and 111 abut each other, they form skew holes in alignment with openings 103 and 104 and the grooves in jaws 39 and 38, respectively.

As shown in FIG. 7, guide 110 has grooves at 125 and 126. As stated previously, guide 111 has identical grooves. Assuming that FIG. 8 is a view of guide 111 similar to the view of guide 110 shown in FIG. 7, a groove 125′ similar to groove 125 mates with groove 126 when the guides abut. Similarly, a groove 126′ in guide 111 mates with groove 125 in guide 110.

FIG. 8 demonstrates the relative movements of pin 112 and 113 in grooves 114 and 115, respectively, upon rotation of jaws 38 and 39, as indicated in dotted lines at 38″ and 39″.

Although some benefit may be derived from the description of FIGS. 13 and 14 which will follow, a description of the operation of the tool 20 will be given first in relation to the structures shown in FIGS. 1 to 12, inclusive. All of the circuit of the tool 20 is shown in FIG. 2 with the exception of a start relay 127 shown in FIG. 13, which may be carried at any convenient place in body 26.

The operation of tool 20 is begun by grasping grip 22 and locating U-shaped member 34 about steel reinforcement rods 36 and 37. Push button 23 is then depressed. This closes switch 24 and energizes start relay 127. Start relay 127, as will be described, then energizes timer 76, which, in turn, controls all subsequent operations and the de-energization of start relay 127. The timer first closes jaws 38 and 39. It next energizes wire motor 59. Clutch 61 is a forward clutch, and clutch 62 is a reverse clutch. Hence, energization of forward clutch 61 will project wire 27 through ferrule 28, tube 30, passage 95, bores 96 and 99, opening 103, guide grooves connecting opening 103 to jaw groove 109, around through the groove in jaw 38, upwardly through the grooves in guides 110 and 111 connecting the groove of jaw 38 with opening 104, and upwardly between grooves 128 and 129 in disc 67 and ring 101 respectively. That is, this is the path that wire 27 takes when clutch 61 is energized. This clutch is, in fact, energized first after wire motor 59 is energized, the drive being through wire motor shaft 69, gear box 60, shafts 63 and 78, differential 58 and drive shaft 57.

After wire 27 has abutted lower shear plate 100, the timer 76 energizes clamp solenoid 74. This causes disc 67 to clamp the end of wire 27 in grooves 128 and 129 in disc 67 and ring 101, respectively.

Timer 76 then de-energizes forward clutch 61 and jaw solenoid 77, and energizes reverse clutch 62. At this point, wire 27 is drawn up tightly around steel reinforcement rods 36 and 37.

After a predetermined length of time, reverse clutch 62 is de-energized. After reverse clutch 62 is de-energized, twist clutch 66 is energized. This causes wire 27 to shear at the contiguous surfaces of upper and lower shear plates 97 and 100 at the bores 96 and 99 thereof, respectively. Immediately thereafter, discs 67 and ring 101 turn together and twist the ends of severed portion 123 of wire 27 together as indicated at 124 in FIG. 12. In this case, guides 110 and 111 are spaced apart, guides having been held together by energization of jaw solenoid 77 and spaced apart during de-energization thereof. Upper shear plate 97 has a lower surface 130 disposed at an angle slightly different than 90° from the axis of shaft 72. Similarly, the upper surface of lower shear plate 100 has a surface 131 to mate with surface 130. The angularity of the surfaces 130 and 131 relative to the axis of shaft 72 makes sleeve 105, discs 67 and ring 101 always return to the position shown in FIG. 2 after the tool 20 has cycled. This makes it possible to immediately project wire 27 along the path through the jaws, et cetera, by maintaining the bore 99, and the openings 103 and 104 in ring 101 in proper alignment with the grooves in guides 110 and 111. The same is true regarding the location of grooves 128 and 129 in disc 67 and ring 101, respectively. For this reason, pins 132 and 133 may be fixed to ring 101 and may be slidable in corresponding holes in disc 67 to maintain further alignment.

After wire portion 123 has been twisted, twist clutch 66 will be de-energized. Clamp solenoid 74 will then be de-energized and lower shear plate 100, disc 67 and ring 101 will return to the position shown in FIG. 2. Wire motor 59 will then be de-energized. Relay 127 will be de-energized next, and timer 76 will be de-energized when normally open contacts 134 of relay 127 open. Relay contacts 134, shown in FIG. 13 open when relay 127 is de-energized.

As shown in FIG. 13, relay 127 is energized by depressing push button 23 which closes starting switch 24. Relay 127 has a pair of self-locking contacts 135 connected from one power line 136 thereto through a normally closed switch 137 operated by timer 76.

One side of all of the blocks shown in FIG. 13 are connected to the other side of the power line indicated at 138. Timer 76 operates all of the switches shown in FIG. 13 with the exception of switch 24, 134 and 135. These are switches 139, 140, 141, 142, 143 and 144. Timer 76 may be a conventional timer which operates switches through a commutator or cam switch. Switching thus may take place through commutator or simply by the cam actuation of switches. The cams may be rotated on a drive shaft driven by a synchronous motor, if desired, as is conventional.

The sequence of operation of only the electrical component parts of the tool 20 shown in FIG. 13 may be better understood from both FIGS. 13 and 14 as follows.

Depression of push button 23 operates switch 24. This energizes start relay 127. Switch 24 is a momentary contact switch. Push button 23 is therefore spring biased outwardly, as is conventional. Release of momentary contact switch 23 therefore will not de-energize start relay 27 because self-locking contacts 135 of start relay 127 will keep the relay energized. Energization of relay 127 also closes normally open contacts 127 and causes timer 76 to begin to operate. Timer 76 energizes and de-energizes jaw solenoid 77, wire motor 59, forward clutch 61, clamp solenoid 74, twist clutch 66 and reverse clutch 62 by actuation and deactuation of switches 139, 140, 141, 142, 143 and 144, respectively. However, the sequence of operation of the switches 139 to 144, respectively, is not necessarily in their numerical order. Further, the timer 76 operates switch 137, which, at the end of the cycle of the tool 20, deenergizes relay 127. The inertia of the timer motor may be sufficient both to de-energize timer relay 127 by opening contacts 134 and to reclose contacts 137.

Figure 14:
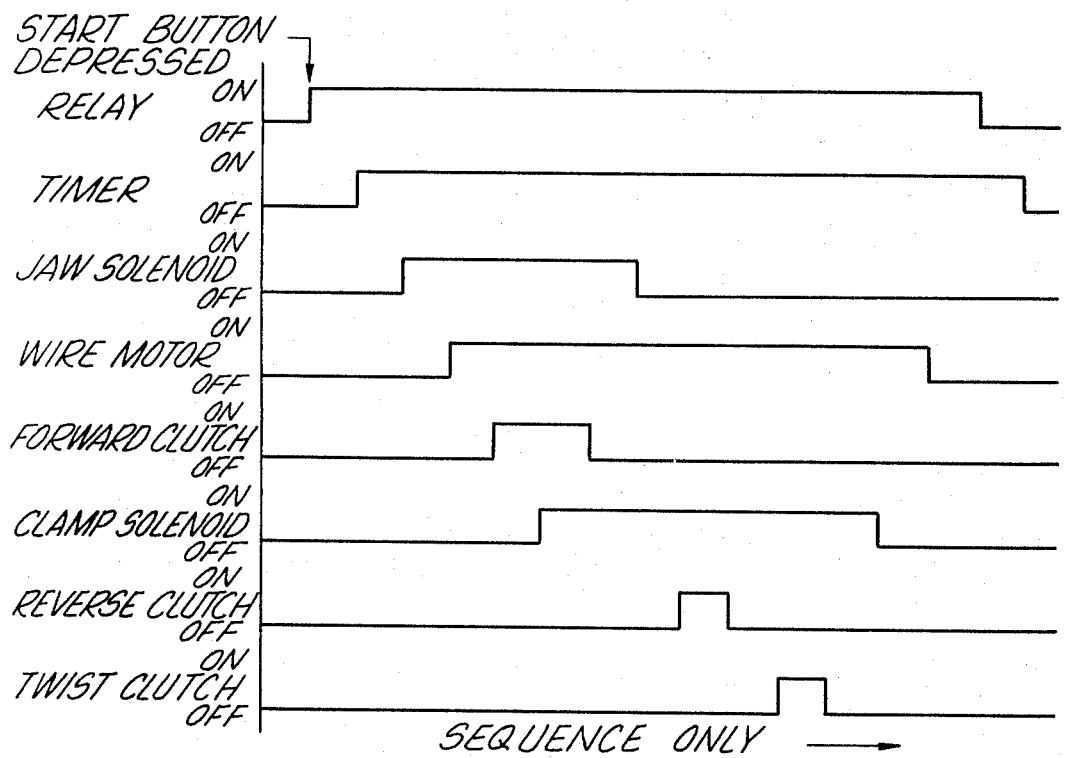
FIG. 14 is a timing diagram illustrating the sequence of operation of several of the individual component parts of the tool shown in FIGS. 2 and 13.

The sequence of operation of all of the blocks shown in FIG. 13 is illustrated in FIG. 14. However, it will be noted that the horizontal axis of the sequence diagram is meant to represent sequence only. This means that the length of time any electrical component is energized is not directly proportional to the length of energizing rectangular voltage pulses illustrated.

Note will be taken that depression of push button 23 and closure of switch 24, thereby energizes relay 127. Next, the wire motor 59 is energized. Next, forward clutch 61 is energized. Clamp solenoid 74 is then energized. Up to this point no electrical component of the tool 20 has been de-energized. However, before reverse clutch 62 and twist clutch 66 are energized or de-energized, forward clutch 61 and jaw solenoid 77 are de-energized in the order mentioned. Timer 76 is de-energized last, and relay 127 is deenergized second to last.

Next, reverse clutch 62 is energized and de-energized before any other electrical component of tool 20 is energized or de-energized. After reverse clutch 62 has been energized, twist clutch 66 is energized and de-energized before any other electrical component is energized or de-energized.

This leaves clamp solenoid 74, wire motor 59, relay 127 and timer 76 energized. All four of these electrical components are then de-energized. They are de-energized in the order just mentioned.

In accordance with the foregoing, it will be appreciated that guides 110 and 111 provide positive and secure means for rapidly and accurately introducing wire 27 in a path around steel reinforcement rods 36 and 37. The disc 67 and ring 101, and the structure surrounding the same also facilitate the positive and secure operation of manipulation of wire 27 and of twisting the same as at 124 in FIG. 12. The tying action performed by tool 20 may also be produced rapidly. Further, wire portion 123 may be twisted tightly about steel reinforcement rods 36 and 37. This is not only facilitated by the structures described, but also by the method of reversing the movement of wire 27 by the energization of reverse clutch 62 and the reverse movement of wire 27, thereby produced inside tube 30 and body passageway 95. Further, the many operations performed by the tool 20 are performed efficiently and rapidly with very few uncomplicated component parts.

The phrase "torque means" as used herein, refers to disc 67 and ring 101 which are employed to align wire 27 and to twist the ends of the wire together.

Although only one specific embodiment of the present invention has been described and illustrated herein, many changes and modifications will of course suggest themselves to those skilled in the art. This single embodiment has been selected for this disclosure only for the purpose of illustration. The present invention should therefore not be limited to the embodiment so selected, the true scope of the invention being defined only in the appended claims.

What is claimed is:

1. A wire tying machine comprising: a body; a pair of semicircular jaws rotatable toward and away from each other on said body, the ends of said jaws being movable to an abutting position, said jaws having facing interior grooves to receive a length of wire; a hollow guard fixed to said body surrounding each jaw; resilient means on said body to bias said jaws against said guards inside thereof; first power means on said body actuable to close said jaws; a guide on said body for each jaw, each guide having grooves in opposed surfaces thereof; means on said body responsive to closure of said jaws for moving said guides contiguous to each other with said guide grooves in alignment with said jaw grooves; a ring having an internal surface tapered from a larger opening at one end to a smaller opening at the other end thereof, said ring being rotatably mounted in a bearing in said body; means operative while said jaws are closed including a friction drive to project a length of wire through said larger opening, through said smaller opening, through one guide groove, through said jaw grooves, through the other guide groove, and backward through said ring smaller openings; a conically shaped rotor rotatably mounted on said body adjacent said ring, said rotor being rotatable about the same rotational axis as that of said ring; means to move said rotor from an axial position spaced from said ring to an axial position contiguous thereto to grip the end of wire therebetween; passageway means adjacent said rotor to carry wire; second power means actuable to spin said rotor to shear wire at the position of said passageway means and to twist the ends of the length of wire so severed about each other while one end is gripped between said rotor and said ring, said first power means being deactuable during actuation of said second power means to permit movement of said guides apart, said friction drive being actuable to reverse wire movement in said passageway means, said rotor having grooves therein on opposite sides thereof to receive wire; means to locate one of said rotor grooves at the position of said passageway means at the end of each wire tying cycle; and means to control the sequence of operation in a manner (1) to cause said jaws to close, (2) to cause wire to be threaded through said ring, through said guides, through said jaws and back through said ring, (3) to cause said rotor and said ring to grip the end of the wire, (4) to pull wire back through said passageway means, (5) to shear the wire at said passageway means, and (6) to twist the ends of said severed length of said wire about each other.

2. A wire tying machine comprising: a pair of jaws rotatable to encircle an object to be tied, said jaws having inner opposed grooves therein to carry a wire; a hollow U-shaped body having legs to guard said jaws and a bight portion to rest against the object, said jaws being rotatable from abutting positions outside of said guard to spaced positions inside thereof; means to thread wire through said jaw grooves; means to hold the end of said wire in a fixed position; means to pull said wire out of said jaw grooves and around the object while the said bight portion of said U-shaped body rests against the object and the said wire end is held in a fixed position; means to sever a portion of the wire; and means to twist the ends of the said severed wire portion about each other.

3. A wire tying machine comprising: a body; a disc rotatable on said body, said disc having angularly disposed passages extending therethrough from approximately opposite sides thereof toward the axis thereof, said passages having their axes lying in separate planes; means actuable to move wire into and out of said passages; means actuable to clamp the end of a length of wire in one of said passages; rotary means actuable to turn said disc about its axis while said wire end is clamped therein; means to shear the wire leaving the ends thereof within said passages; and a device to control the sequence of the actuation of said means (1) to cause wire to be threaded through said passages, (2) to actuate said clamp means after step 1 to hold the wire end, (3) to cause the wire to be sheared after step 1, (4) to cause rotation of said disc after steps 1, 2 and 3.

4. A wire tying machine comprising: a body; a disc rotatable on said body, said disc having angularly disposed passages extending therethrough from approximately opposite sides thereof toward the axis thereof, said passages having their axes lying in separate planes; means actuable to move wire into and out of said passages; means actuable to clamp the end of a length of wire in one of said passages; rotary means actuable to turn said disc about its axis while said wire end is clamped therein; means to shear the wire leaving the ends thereof within said passages; a device to control the sequence of the actuation of said means (1) to cause wire to be threaded through said passages, (2) to actuate said clamp means after step 1 to hold the wire end, (3) to cause the wire to be sheared after step 1, (4) to cause rotation of said disc after steps 1, 2 and 3; and means to relocate one of said passages at a wire input position when said rotary means is deactuated.

5. A wire tying machine comprising: a body; a pair of jaws having an approximately semi-circular shape; said jaws being rotatable on said body from positions with the ends thereof spaced apart to positions with the said end thereof contiguous to one another, said jaws having aligned grooves therein to receive a length of wire; a pair of grooved guides positioned in the throat of said jaws to receive wire therebetween and to guide the wire into said jaw grooves, said guides being movable to contiguous positions with the grooves thereof in alignment with said jaw grooves; feed means including an input passageway to carry wire; torque means having passages for alignment with said guide grooves when they are held in said contiguous positions, said torque means being rotatable to a position such that one of said passages lies in alignment with both said feed means passageway and one of said guide grooves when said guides are held in said contiguous positions; said torque means including means to grip one end of a length of wire; and power means actuable to rotate said torque means to twist the ends of the length of wire about each other, said guides being movable to spaced positions when said power means is actuated to permit the ends of the said length of wire to be twisted about each other therebetween.

6. A wire tying machine comprising: a body; a pair of jaws having an approximately semicircular shape; said jaws being rotatable on said body from positions with the ends thereof spaced apart to positions with the said end thereof contiguous to one another, said jaws having aligned grooves therein to receive a length of wire; a pair of grooved guides positioned in the throat of said jaws to receive wire therebetween and to guide the wire into said jaw grooves, said guides being movable to contiguous positions with the grooves thereof in alignment with said jaw grooves; feed means including an input passageway to carry wire; torque means having passages for alignment with said guide grooves when they are held in said contiguous positions, said torque means being rotatable to a position such that one of said passages lies in alignment with both said feed means passageway and one of said guide grooves when said guides are held in said contiguous positions; said torque means including means to grip one end of a length of wire; power means actuable to rotate said torque means to twist the ends of the length of wire about each other, said guides being movable to spaced positions when said power means is actuated to permit the ends of the said length of wire to be twisted about each other therebetween; linkage means actuable to close said jaws; and guide control means actuable with said linkage means for locating said guides in contiguous positions, said guide control means holding said guides in spaced positions during deactuation of said guide control means.

7. A wire tying machine comprising: a body; a pair of jaws having an approximately semicircular shape; said jaws being rotatable on said body from positions with the ends thereof spaced apart to positions with the said end thereof contiguous to one another, said jaws having aligned grooves therein to receive a length of wire; a pair of grooved guides positioned in the throat of said jaws to receive wire therebetween and to guide the wire into said jaw grooves, said guides being movable to contiguous positions with the groove thereof in alignment with said jaw grooves; feed means including an inlet passageway to carry wire; torque means having passages for alignment with said guide grooves when they are held in said contiguous positions, said torque means being rotatable to a position such that one of said passages lies in alignment with both said feed means passageway and one of said guide grooves when said guides are held in said contiguous positions; said torque means including means to grip one end of a length of wire; power means actuable to rotate said torque means to twist the ends of the length of wire about each other, said guides being movable to spaced positions when said power means is actuated to permit the ends of the said length of wire to be twisted about each other therebetween; a pair of pins on said body, said jaws being pivoted to said body about said pins; means for rotating said jaws about said pins to close the said jaws; and cam means around said pins between said jaws and said guides to space said guides apart when said jaws open, and to cause said guides to become located contiguous to one another when said jaws close.

8. A wire tying machine comprising: a body; a pair of jaws having an approximately semicircular shape; said jaws being rotatable on said body from positions with the ends thereof spaced apart to positions with the said end thereof contiguous to one another, said jaws having aligned grooves therein to receive a length of wire; a pair of grooved guides positioned in the throat of said jaws to receive wire therebetween and to guide the wire into said jaw grooves, said guides being movable to contiguous positions with the grooves thereof in alignment with said jaw grooves; feed means including an input passageway to carry wire; torque means having passages for alignment with said guide grooves when they are held in said contiguous positions, said torque means being rotatable to a position such that one of said passages lies in alignment with both said feed means passageway and one of said guide grooves when said guides are held in said contiguous positions; said torque means including means to grip one end of a length of wire; power means actuable to rotate said torque means to twist the ends of the length of wire about each other, said guides being movable to spaced positions when said power means is actuated to permit the ends of the said length of wire to be twisted about each other therebetween; and stop means to limit movement of said jaws around an object to be tied, said feed means being located rearward of said stop means, said feed means being actuable to draw a length of wire up near the object, all of the said structure of the machine except said stop means and said jaws being located wholly rearward of said stop means.

9. A wire tying machine comprising: a body; a pair of jaws having an approximately semicircular shape; said jaws being rotatable on said body from positions with the ends thereof spaced apart to positions with the said end thereof contiguous to one another, said jaws having aligned grooves therein to receive a length of wire; a pair of grooved guides positioned in the throat of said jaws to receive wire therebetween and to guide the wire into said jaw grooves, said guides being movable to contiguous positions with the grooves thereof in alignment with said jaw grooves; feed means including an input passageway to carry wire; torque means having passages for alignment with said guide grooves when they are held in said contiguous positions, said torque means being rotatable to a position such that one of said passages lies in alignment with both said feed means passageway and one of said guide grooves when said guides are held in said contiguous positions; said torque means including means to grip one end of a length of wire; power means actuable to rotate said torque means to twist the ends of the length of wire about each other, said guides being movable to spaced positions when said power means is actuated to permit the ends of the said length of wire to be twisted about each other therebetween; a pair of pins on said body, said jaws being pivoted to said body about said pins; means for rotating said jaws about said pins to close the said jaws; cam means around said pins between said jaws and said guides to space said guides apart when said jaws open, and to cause said guides to become located contiguous to one another when said jaws close; and stop means to limit movement of said jaws around an object to be tied, said feed means being located rearward of said stop means, said feed means being actuable to draw a length of wire up near the object, all of the said structure of the machine except said stop means on said jaws being located wholly rearward of said stop means.

References Cited
UNITED STATES PATENTS

| | | | |
|---|---|---|---|
| 1,320,515 | 11/1919 | Warwick | 140—93 |
| 3,245,434 | 4/1966 | Collins et al. | 140—93.6 |

FOREIGN PATENTS

| | | |
|---|---|---|
| 172,283 | 8/1960 | Sweden. |

RICHARD J. HERBST, *Primary Examiner.*

E. M. COMBS, *Assistant Examiner.*